United States Patent

Ishikawa et al.

[11] Patent Number: 5,795,642
[45] Date of Patent: Aug. 18, 1998

[54] MAGNETIC RECORDING MEDIUM

[75] Inventors: Akira Ishikawa; Hidehiko Nakayama; Kazutaka Yamashita, all of Tochigi-ken, Japan

[73] Assignee: Kao Corporation, Tokyo, Japan

[21] Appl. No.: 742,815

[22] Filed: Nov. 1, 1996

[30] Foreign Application Priority Data

Apr. 26, 1996 [JP] Japan ............................ 8-107909

[51] Int. Cl.$^6$ ........................................ G11B 5/66
[52] U.S. Cl. .................. 428/141; 428/336; 428/694 B; 428/694 BS; 428/694 BB; 428/694 BR; 428/694 BA; 428/694 BH; 428/900
[58] Field of Search ............ 428/694 B, 694 BS, 428/694 BB, 694 BR, 694 BA, 694 BM, 900, 141, 336

[56] References Cited

U.S. PATENT DOCUMENTS

| 4,537,833 | 8/1985 | Kasuge ............................ 428/328 |
| 4,874,636 | 10/1989 | Okita et al. ...................... 427/130 |
| 5,541,008 | 7/1996 | Hatanaka ........................ 428/694 B |

FOREIGN PATENT DOCUMENTS

| 63-255814 | 10/1988 | Japan . |
| 64-86324 | 3/1989 | Japan . |
| 1-94531 | 4/1989 | Japan . |
| 1-241019 | 9/1989 | Japan . |
| 1-277325 | 11/1989 | Japan . |
| 2-87320 | 3/1990 | Japan . |
| 2-310821 | 12/1990 | Japan . |
| 3-288329 | 12/1991 | Japan . |
| 4-229415 | 8/1992 | Japan . |
| 4-79046 | 12/1992 | Japan . |
| 6-42285 | 6/1994 | Japan . |

*Primary Examiner*—Leszek Kiliman
*Attorney, Agent, or Firm*—Oblon, Spivak, McClelland, Maier & Neustadt, P.C.

[57] ABSTRACT

Magnetic recording media comprising a nonmagnetic substrate, a surface layer and a back layer, the surface layer having an intermediate layer provided on the surface side of the nonmagnetic substrate and a magnetic layer as a top layer, the back layer having a backcoating layer provided on the back side of the nonmagnetic substrate, the magnetic layer containing a ferromagnetic metal powder and a binder, wherein the surface layer has a residual solvent content of 5 to 1000 ppm, the ferromagnetic metal powder is a ferromagnetic metal powder mainly comprising iron and containing 0.8 to 20 parts by weight of at least one element selected from Group IIIa elements, inclusive of lanthanides, of the Periodic Table per 100 parts by weight of Fe atoms, the magnetic layer has a thickness of 0.05 to 0.6 μm, the magnetic layer has a center-line surface roughness Ra of 1 to 5 nm, the back layer has a residual solvent content of 5 to 800 ppm, and the backcoating layer has a center-line surface roughness Ra of 2 to 8 nm, exhibit excellent electromagnetic characteristics and storage stability.

21 Claims, 1 Drawing Sheet

MAGNETIC RECORDING MEDIUM

BACKGROUND OF THE INVENTION

1. Field of the Invention

The present invention relates to magnetic recording media which exhibit excellent electromagnetic characteristics and storage stability.

2. Description of the Background

Magnetic recording media have been widely used in the form of tapes, discs, drums, sheets, etc. These magnetic recording media are generally prepared by coating a nonmagnetic substrate, such as a polyester film, with a magnetic coating composition consisting mainly of magnetic powder and a binder to form a magnetic layer and further forming a backcoating layer on the back side of the nonmagnetic substrate. In recent years, there has been a demand for magnetic recording media which have a reduced size and an increased recording density. In order to meet these demands, magnetic recording media having a multilayer structure having, for example, an additional magnetic layer or a nonmagnetic layer as an intermediate layer between the magnetic layer and the nonmagnetic substrate, have been developed.

However, conventional magnetic recording media have a disadvantage in that they have poor electromagnetic characteristics and poor storage stability. Specifically, they are apt to undergo a reduction in electromagnetic characteristics while stored.

Various proposals have been disclosed in order to solve the above-mentioned problem. For example, U.S. Pat. No. 4,537,833 corresponding to Japanese Patent Publication 4-79046 discloses a magnetic recording medium in which the magnetic powder in the magnetic layer has a specific surface area and the magnetic layer has a specific residual solvent content and a specific surface roughness; Japanese Patent Application Laid-Open 63-255814 discloses a magnetic recording medium in which the backcoating layer has a specific residual solvent content; Japanese Patent Application Laid-Open 3-288329 discloses a process for producing a magnetic recording medium in which the magnetic layer and backcoating layer have respective specific residual solvent contents; Japanese Patent Application Laid-Open 2-87320 discloses a magnetic recording medium in which the magnetic layer has a specific residual solvent content; Japanese Patent Application Laid-Open 4-229415 discloses a magnetic recording medium in which the magnetic layer has a specific residual solvent content and a process for producing the same; Japanese Patent Application Laid-Open 2-310821 discloses a magnetic recording medium in which the magnetic layer and/or the backcoating layer have a specific residual solvent content and a specific peak temperature of the loss tangent; and Japanese Patent Application Laid-Open 1-241019 discloses a magnetic recording medium in which the coating layers, such as a magnetic layer or a backcoating layer, have a specific residual solvent content.

Japanese Patent Application Laid-Open 1-277325 discloses a magnetic recording medium in which the specific surface area of the magnetic powder in the magnetic layer, the average particle size of carbon black, and the residual solvent content of the magnetic layer are specified; U.S. Pat. No. 4,874,636 corresponding to Japanese Patent Publication 6-42285 discloses a process for producing a magnetic recording medium in which a magnetic layer comprising a specific binder is dried until the residual solvent content reaches a given range, subjected to calendering, and then again dried completely; Japanese Patent Application Laid-Open 1-94531 discloses a process for producing a magnetic recording medium comprising forming a magnetic layer using a magnetic coating composition containing an organic solvent having a specific index of solvent evaporation rate, subjecting the magnetic layer to calendering while the residual solvent content thereof is within a specific range, and then thoroughly drying the magnetic layer; and Japanese Patent Application Laid-Open 64-86324 discloses a process for producing a magnetic recording medium having at least one magnetic layer and containing a polymeric polyisocyanate as a hardening component of a binder, the process comprising subjecting the coating layer to calendering after the residual solvent content of the layer has fallen within a specific range.

However, the above-mentioned problem still remains unsolved in spite of these proposals disclosed to date. Thus, there remains a need for magnetic recording media which exhibit excellent electromagnetic characteristics and storage stability.

SUMMARY OF THE INVENTION

Accordingly, it is one object of the present invention to provide novel magnetic recording media.

It is another object of the present invention to provide novel magnetic recording media which exhibit excellent initial electromagnetic characteristics.

It is another object of the present invention to provide novel magnetic recording media which exhibit excellent storage stability.

It is another object of the present invention to provide novel magnetic recording media having excellent electromagnetic characteristics and also excellent storage stability, for example, resistance against reduction in electromagnetic characteristics during storage.

These and other objects, which will become apparent during the following detailed description, have been achieved by the inventors' discovery that the objects of the present invention are accomplished by magnetic recording media in which the layers on the surface side of the nonmagnetic substrate have a specific residual solvent content, the magnetic layer comprises a specific ferromagnetic metal powder and has a specific thickness and a specific center-line surface roughness, the layers on the back side of the nonmagnetic substrate have a specific residual solvent content, and the backcoating layer has a specific center-line surface roughness.

Thus, the present invention has been completed based on this finding and provides a magnetic recording medium comprising a nonmagnetic substrate, a surface layer and a back layer, the surface layer having an intermediate layer provided on the surface side of the nonmagnetic substrate and a magnetic layer as a top layer, the back layer having a backcoating layer provided on the back side of the nonmagnetic substrate, the magnetic layer containing a ferromagnetic metal powder and a binder, wherein the surface layer has a residual solvent content of 5 to 1000 ppm;

the ferromagnetic metal powder is a ferromagnetic metal powder mainly comprising iron and containing 0.8 to 20 parts by weight of at least one element selected from Group IIIa elements, inclusive of lanthanides, of the Periodic Table, e.g., La, Ce, Pr, Nd, Pm, Sm, Eu, Gd, Tb, Dy, Ho, Er, Tm, Yb, Lu, Sc, Y, etc., per 100 parts by weight of an Fe atom;

the magnetic layer has a thickness of 0.05 to 0.6 μm;

the magnetic layer has a center-line surface roughness, Ra, of 1 to 5 nm;

the back layer has a residual solvent content of 5 to 800 ppm; and the backcoating layer has a center-line surface roughness, Ra, of 2 to 8 nm.

The terminology "residual solvent content" as used herein is intended to include both the residual solvent content of a magnetic recording medium immediately after preparation and that of a magnetic recording medium having been used or stored under general conditions of use or storage, each as measured in accordance with the method of measurement described in Examples hereinafter given.

The magnetic recording medium according to the present invention thus constructed has excellent electromagnetic characteristics and also exhibits excellent storage stability, for example, in the respect that the magnetic recording medium does not exhibit a great reduction in its electromagnetic characteristics while stored.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The magnetic recording medium of the present invention will be described below in detail.

Figure 1:
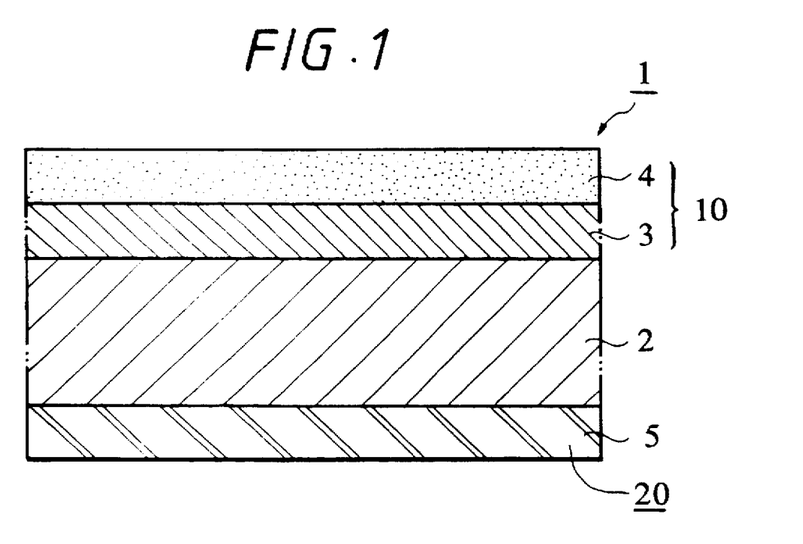
FIG. 1 is a schematic cross section illustrating the layer structure of the magnetic recording medium of the present invention.

The explanation is made in the context of a preferred structure of the magnetic recording medium of the present invention by referring to FIG. 1.

As shown in FIG. 1, a magnetic recording medium 1 according to the present invention is comprised of a nonmagnetic substrate 2, a surface layer 10 having an intermediate layer 3 which is provided on the surface side of the nonmagnetic substrate 2 and a magnetic layer 4 which is provided on the intermediate layer 3 as a top layer, and a back layer 20 having a backcoating layer 5 which is provided on the back side of the nonmagnetic substrate 2. The magnetic layer 4 contains a ferromagnetic metal powder and a binder.

The magnetic recording medium of the present invention may further have other layers in the surface layer 10 or back layer 20 in addition to the above-mentioned nonmagnetic substrate 2, intermediate layer 3, magnetic layer 4, and backcoating layer 5. For example, a primer layer may be provided between the nonmagnetic substrate 2 and the intermediate layer 3, or a primer layer may be provided between the nonmagnetic substrate 2 and the backcoating layer 5; and a magnetic or nonmagnetic layer for recording servo signals to cope with hard systems using long wavelength signals may be provided in the surface layer 10 (i.e., between the nonmagnetic substrate 2 and the intermediate layer 3 or between the intermediate layer 3 and the magnetic layer 4).

The magnetic recording medium of the present invention is characterized in that: the surface layer has a residual solvent content of 5 to 1000 ppm; the ferromagnetic metal powder is a ferromagnetic metal powder mainly comprising iron and containing 0.8 to 20 parts by weight of at least one element selected from Group IIIa elements, inclusive of lanthanides, of the Periodic Table per 100 parts by weight of an Fe atom; the magnetic layer has a thickness of 0.05 to 0.6 μm; the magnetic layer has a center-line surface roughness, Ra, of 1 to 5 nm; the back layer has a residual solvent content of 5 to 800 ppm; and the backcoating layer has a center-line surface roughness, Ra, of 2 to 8 nm.

The particulars of the magnetic recording medium of the present invention will now be described according to its structure.

The nonmagnetic substrate which can be used in the magnetic recording medium of the present invention can be selected from those commonly known with no particular restriction. Examples of useful nonmagnetic substrates include flexible films or discs made of high polymers; and films, discs or cards made of nonmagnetic metals, e.g., Cu, Al or Zn, glass, or ceramics, e.g., porcelain or earthenware.

Suitable high polymers providing flexible films or discs include polyesters, such as polyethylene terephthalate, polybutylene terephthalate, polyethylene naphthalate, polycyclohexylene dimethylene terephthalate, and polyethylene bisphenoxycarboxylate; polyolefins, such as polyethylene and polypropylene; cellulose derivatives, such as cellulose acetate butyrate and cellulose acetate propionate; vinyl resins, such as polyvinyl chloride and polyvinylidene chloride; polyamides, polyimides, such as an aramid resin, polycarbonates, polysulfones, polyether ether ketones, polyurethanes, and the like. These polymers may be used either individually or as a combination of two or more thereof.

The surface layer provided on the surface side of the nonmagnetic substrate used in the magnetic recording medium of the present invention has an intermediate layer provided on the surface side of the nonmagnetic substrate and a magnetic layer provided thereon as a top layer.

The surface layer should have a residual solvent content of 5 to 1000 ppm, preferably 5 to 900 ppm, more preferably 5 to 800 ppm. Where the surface layer has a double layer structure composed of an intermediate layer and a magnetic layer, the total residual solvent content of these two layers should fall within the above range. Where the surface layer has a multilayer structure composed of these two layers plus other layer(s), the total residual solvent content of the three or more layers should fall within the above range. It is practically impossible to reduce the residual solvent content lower than 5 ppm. If the residual solvent content exceeds 1000 ppm, the magnetic layer and the back layer may stick to each other when the magnetic recording medium in the form a recording tape is wound. As a result, the surface of the magnetic layer is roughened. In extreme cases, the magnetic layer tends to come off, or the tape tends to be cut. Further, the magnetic tape tends to undergo curling.

The unit "ppm" as used herein is given by weight.

The intermediate layer, which is provided on the surface side of the nonmagnetic substrate and is essential to the surface layer, may be either a layer having magnetism or a layer having no magnetism.

Where the intermediate layer is a layer having magnetism, it is a magnetic layer containing magnetic powder (hereinafter referred to as a magnetic intermediate layer), which is formed by applying a magnetic intermediate coating composition containing magnetic powder onto the nonmagnetic substrate.

Where the intermediate layer is a layer having no magnetism, it is a nonmagnetic layer containing no magnetic powder (hereinafter referred to as a nonmagnetic intermediate layer), which is formed by applying a nonmagnetic coating composition to the nonmagnetic substrate.

In the present invention, the magnetic intermediate coating composition and the nonmagnetic intermediate coating composition for forming an intermediate layer will sometimes be inclusively referred to as an intermediate coating composition.

The magnetic intermediate coating composition which can be used for the formation of the magnetic intermediate layer preferably includes coating compositions mainly comprising a magnetic powder, a binder, and a solvent.

The magnetic powder to be used in the magnetic intermediate coating composition for the magnetic intermediate layer preferably includes a ferromagnetic powder. Either a soft magnetic powder or a hard magnetic powder may be suitably used.

While the soft magnetic powder to be used is not particularly limited in kind as long as it is soft magnetic powder, magnetic materials used in miniature electrical devices, such as a magnetic head and an electron circuit, are particularly preferred. For example, the soft magnetic materials described in Soshin Chikazumi, Dr. Sc., "Physics of Ferromagnetism, Vol. II.—Magnetic Characteristics and Engineering Application—", pp. 368–376, Syokabo (issued on Mar. 25, 1984), which is incorporated herein by reference, can be used. Soft magnetic oxide powders may be mentioned as specific examples.

Spinel ferrite powders are preferably used as the soft magnetic oxide powder. The spinel ferrite powders include $MnFe_2O_4$, $Fe_3O_4$, $CoFe_2O_4$, $NiFe_2O_4$, $MgFe_2O_4$, $Li_{0.5}Fe_{2.5}O_4$, Mn—Zn ferrite, Mn—Co ferrite, Ni—Zn ferrite, Ni—Cu ferrite, Cu—Zn ferrite, Mg—Zn ferrite, and Li—Zn ferrite, Zn ferrite, and Mn ferrite. These soft magnetic oxide powders may be used either individually or as a combination of two or more thereof.

A soft magnetic metal powder can also be used as the soft magnetic powder. Useful soft magnetic metal powders include Fe—Si alloys, Fe—Al alloys (e.g., Alperm, Alfenol and Alfer), Permalloy (e.g., Ni—Fe binary alloys or multinary alloys composed of the Ni—Fe binary system and Mo, Cu, Cr, etc.), Sendust (Fe—Si—Al alloy consisting of 9.6 wt % of Si, 5.4 wt % of Al, and the balance of Fe), and Fe—Co alloys. These powders may be used either individually or as a combination of two or more thereof.

The soft magnetic oxide powder usually has a coercive force of 0.1 to 150 Oe and a saturation magnetization of 30 to 90 emu/g. The soft magnetic metal powder usually has a coercive force of 0.02 to 100 Oe and a saturation magnetization of 50 to 500 emu/g.

The soft magnetic metal powder can be prepared by, for example, a gas phase method, and the soft magnetic oxide powder can be obtained by, for example, a glass crystallization method, a coprecipitation firing method, a calcination method, a hydrothermal synthesis method, a sol-gel method, and the like.

While the shape of the soft magnetic powder is not particularly limited, it is preferably spherical, tabular or amorphous. The soft magnetic powder preferably has a particle size of 0.001 to 0.2 µm.

The hard magnetic powders include hard magnetic metal powder, hard magnetic oxide powder, and hexagonal ferrite powder.

The hard magnetic metal powder includes those having a metal content of 50% by weight or more, at least 50% by weight of which comprises iron (Fe). Examples of such hard magnetic metal powders are Fe—Co, Fe—Ni, Fe—Al, Fe—Ni—Al, Fe—Co—Ni, Fe—Ni—Al—Zn, and Fe—Al—Si.

The hard magnetic oxide powder includes iron oxides (ferromagnetic iron oxide powder represented by $FeO_x$ ($4/3 \leq x \leq 3/2$)); $FeO_x$ doped with a divalent metal, e.g., Cr, Mn, Co or Ni; Co-coated $FeO_x$ ($FeO_x$ coated with Co); chromium dioxide; and chromium dioxide doped with a metal, e.g., Na, K, Fe or Mn, a semiconductor, e.g., P, or an oxide of the metal.

The hard magnetic metal powders and the hard magnetic oxide powders preferably have a needle-like (acicular) or spindle-like shape and preferably have a major axis length of 0.05 to 0.25 µm, more preferably 0.05 to 0.2 µm, an acicular ratio of 3 to 20, and an X-ray measured particle size of 130 to 250 Å.

Suitable hexagonal ferrite powders include fine tabular barium ferrite and strontium ferrite, and magnetic powders obtained by displacing part of the Fe atoms of these ferrites with Ti, Co, Ni, Zn, V or the like atom. The hexagonal ferrite powders preferably have a tabular diameter of 0.02 to 0.09 µm and an aspect ratio of 2 to 7.

If desired, the magnetic powder in the magnetic intermediate coating composition forming the magnetic intermediate layer may contain rare earth elements or transition metal elements.

In order to improve the dispersibility of the magnetic powder, the magnetic powder may be subjected to a surface treatment.

The surface treatment can be carried out in the same manner as described in T. J. Wiseman et al., "Characterization of Powder Surfaces", (Academic Press, 1976) which is incorporated herein by reference. For example, the surface of the magnetic particles can be coated with an inorganic oxide, such as $Al_2O_3$, $SiO_2$, $TiO_2$, $ZrO_2$, $SnO_2$, $Sb_2O_3$ or ZnO. These inorganic oxides may be used either individually or as a combination of two or more thereof.

The surface treatment can also be carried out by using an organic substance, such as a silane coupling agent, a titan coupling agent or an aluminum coupling agent.

Suitable binders which can be used in the magnetic intermediate coating composition forming the magnetic intermediate layer include thermoplastic resins, thermosetting resins, and reactive resins, either individually or as a mixture thereof.

Examples of suitable binders are vinyl chloride resins, polyester, polyurethane, nitrocellulose, and epoxy resins. In addition, the resins described in Japanese Patent Application Laid-Open 57-162128, page 2, upper right column, line 16 to lower right column, line 19, which is incorporated herein by reference, are also employable. These binders can contain a polar group for improvement in dispersibility.

The binder is suitably used in an amount of from 5 to 200 parts by weight, preferably from 5 to 100 parts by weight, per 100 parts by weight of the magnetic powder.

The solvent for the intermediate coating composition, which is used for the magnetic intermediate coating composition for forming the magnetic intermediate layer, includes alcohols, such as methanol, ethanol, n-propanol, isopropyl alcohol, n-butanol, sec-butanol, isobutanol, 3-pentanol, isopentanol, n-hexanol, methylamyl alcohol, 2-ethylbutanol, furfuryl alcohol, and cyclohexanol; polyols, such as ethylene glycol, propylene glycol, 1,3-butanediol, 2-methyl-2,4-pentanediol (hexylene glycol), and glycerol;

ether alcohols. such as 2-methoxyethanol (methyl cellosolve). 1-methoxy-2-propanol. 2-ethoxyethanol (cellosolve). 1-ethoxy-2-propanol. 2-butoxyethanol (butyl cellosolve) 2-(2-methoxyethoxy)ethanol. 2-(2-ethoxyethoxy)ethanol. and 2-(2-butoxyethoxy)-ethanol; ethers, such as ethyl ether and 1,4-dioxane; ketones, such as acetone. methyl ethyl ketone (MEK). methyl n-propyl ketone. diethyl ketone. methyl isobutyl ketone (MIBK). methyl n-butyl ketone, ethyl n-butyl ketone, methyl n-amyl ketone, diisobutyl ketone. methyl n-hexyl ketone, mesityl oxide. cyclohexanone. diacetone alcohol. methyl phenol ketone, and isophorone; acetic esters, such as methyl acetate. ethyl acetate, n-propyl acetate, isopropyl acetate, n-butyl acetate, sec-butyl acetate, isobutyl acetate, 2-methoxyethyl acetate, amyl acetate, 2-ethoxyethyl acetate, and 2-(2-ethoxyethoxy)-ethyl acetate; chlorinated hydrocarbons, such as methylene chloride. ethylene dichloride, chloroform, trichloroethylene. 1,1,2-trichloroethane. carbon tetrachloride. perchloroethylene. and monochlorobenzene; nitro compounds, such as nitromethane, nitroethane, 1-nitropropane, and 2-nitropropane; and hydrocarbons, such as n-pentane. n-hexane. n-heptane, n-octane, benzene, toluene, p-xylene, ethylbenzene, cyclohexane, methylcyclohexane, and tetrahydronaphthalene. From the standpoint of capability of dissolving a binder, ketone solvents are preferred. These solvents can be used individually or as a mixture thereof.

The proportion of the solvent for the intermediate coating composition which is used for the magnetic intermediate coating composition is preferably 80 to 500 parts by weight, more preferably 100 to 350 parts by weight, per 100 parts by weight of the magnetic powder.

A mixed solvent is preferred for use in the intermediate coating composition. The mixed solvent preferably contains, of the solvents enumerated above for use in the intermediate coating composition, a high-boiling solvent having a boiling point of 130° to 180° C. or a low-volatile solvent having a solvent evaporation rate index of 10 to 45, and more preferably contains a high-boiling and low-volatile solvent having a boiling point of 130° to 180° C. and a solvent evaporation rate index of 10 to 45. That is, the mixed solvent preferably has the high-boiling solvent, the low-volatile solvent, and/or the high-boiling and low-volatile solvent.

The terminology "solvent evaporation rate index" as referred to above is the ratio of the evaporation rate of a solvent to that of n-butyl acetate, taken as 100, and is a measure of the volatility of a solvent. For the details, refer to Tenple C. Patton, *Paint Flow and Pigment Dispersion*, pp. 380–381 & 462–467, Interscience Publishers, a division of John Wiley & Sons, New York, London, Sydney (1964), which is incorporated herein by reference.

Examples of preferred high-boiling solvents are isopentanol, n-hexanol, methylamyl alcohol, 2-ethylbutanol, furfuryl alcohol, cyclohexanol, 2-ethoxyethanol, 1-ethoxy-2-propanol, 2-butoxyethanol, ethyl n-butyl ketone, methyl n-amyl ketone, diisobutyl ketone, methyl-n-hexyl ketone, cyclohexanone, diacetone alcohol, 2-methoxyethyl acetate, amyl acetate, 2-ethoxyethyl acetate, monochlorobenzene, 1-nitropropane, p-xylene, and ethylbenzene. They can be used either individually or as a mixture thereof.

Examples of preferred low-volatile solvents are n-butanol, methylamyl alcohol, 2-ethoxyethanol, ethyl n-butyl ketone, methyl n-amyl ketone, diisobutyl ketone, methyl n-hexyl ketone, cyclohexanone, diacetone alcohol, 2-methoxyethyl acetate, and 2-ethoxyethyl acetate. They can be used either individually or as a mixture thereof.

The high-boiling and low-volatile solvents which are preferably used include those enumerated above in both the categories of high-boiling solvent and low-volatile solvent, that is, methylamyl alcohol, 2-ethoxyethanol, ethyl n-butyl ketone, methyl n-amyl ketone, diisobutyl ketone, methyl n-hexyl ketone, cyclohexanone, diacetone alcohol, 2-methoxyethyl acetate, and 2-ethoxyethyl acetate. The most preferred of them is cyclohexanone. They can be used either individually or as a mixture thereof.

The proportion of the high-boiling solvent, the low-volatile solvent or the high-boiling and low-volatile solvent in the mixed solvent is preferably 5 to 90% by weight, still preferably 10 to 85% by weight, particularly preferably 12 to 80% by weight, based on the total weight of the mixed solvent. If the proportion is less than 5% by weight, the coating layer tends to dry before it is passed through a magnetic field of magnetic orientation apparatus, failing to obtain the desired degree of orientation. If the proportion exceeds 90% by weight, the drying conditions must be enhanced, which is unfavorable for productivity. Other components of the mixed solvent than the high-boiling solvent, the low-volatile solvent, and/or the high-boiling and low-volatile solvent can be selected appropriately out of the above-mentioned solvents for the intermediate coating composition exclusive of the high-boiling solvent, low-volatile solvent, and high-boiling and low-volatile solvent.

If desired, the magnetic intermediate coating composition for forming the magnetic intermediate layer may contain additives generally used in magnetic recording media, such as dispersants, lubricants, abrasives, antistatics, rust inhibitors, antifungals, and hardeners. Specific examples of usable additives are given in Japanese Patent Application Laid-Open 57-162128, page, 2, upper left column, line 6 to upper right column, line 10 and page 3, upper left column, line 6 to page 3, upper right column, line 18, which is incorporated herein by reference.

The nonmagnetic intermediate coating composition used for formation of the nonmagnetic intermediate layer preferably comprises nonmagnetic powder, a binder, and a solvent as main components.

The nonmagnetic powder which can be used in the nonmagnetic intermediate coating composition is not particularly limited as long as it is nonmagnetic. Suitable nonmagnetic powders include particles of carbon black, graphite, titanium oxide, barium sulfate, zinc sulfide, magnesium carbonate, calcium carbonate, zinc oxide, calcium oxide, magnesium oxide, tungsten disulfide, molybdenum disulfide, boron nitride, tin dioxide, silicon dioxide, nonmagnetic chromium oxide, alumina, silicon carbide, cerium oxide, corundum, artificial diamond, nonmagnetic iron oxide, garnet, siliceous stone, silicon nitride, molybdenum carbide, boron carbide, tungsten carbide, titanium carbide, diatomaceous earth, dolomite, and resins. In particular, carbon black, titanium oxide, barium sulfate, calcium carbonate, alumina, and nonmagnetic iron oxide are preferred.

These nonmagnetic particles may have a spherical shape, a tabular shape, an acicular shape, or an amorphous shape. Spherical, tabular, and amorphous nonmagnetic particles preferably have a particle size of 5 to 200 nm, and acicular particles preferably have a major axis length of 20 to 300 nm with an acicular ratio of 3 to 20.

For the purpose of improving the dispersibility of the nonmagnetic powder, the nonmagnetic powder can be subjected to the same surface treatment as that applied to the magnetic powder contained in the magnetic intermediate layer.

The binder which can be used in the nonmagnetic intermediate coating composition for the nonmagnetic intermediate layer can be selected from those usable in the above-described magnetic intermediate coating composition.

The binder is preferably used in an amount of 5 to 200 parts by weight, more preferably 5 to 100 parts by weight, per 100 parts by weight of the nonmagnetic powder.

Specific examples of the solvent which can be used in the nonmagnetic intermediate coating composition for the nonmagnetic intermediate layer and the proportion of the solvent in the composition are the same as those described above for the magnetic intermediate coating composition.

If desired, the nonmagnetic intermediate coating composition may contain additives generally used in magnetic recording media, such as dispersants, lubricants, abrasives, antistatics, rust inhibitors, antifungals, and hardeners. Specific examples of usable additives are the same as those enumerated above for the magnetic intermediate coating composition.

The intermediate coating composition can be prepared by, for example, preliminarily mixing the magnetic or nonmagnetic powder, the binder, and a part of the solvent for the intermediate coating composition in a Naughter mixer, etc., kneading the premixture in a continuous twin-screw kneader, etc., diluting the mixture with another part of the solvent for the intermediate coating composition, followed by dispersing by means of a sand mill, etc., adding additives such as a lubricant to the dispersion, filtering the mixture, and adding to the filtrate a hardener, such as a polyisocyanate, and the remainder of the solvent for the intermediate coating composition.

The intermediate layer preferably has a dry thickness of 0.2 to 5 μm, more preferably 0.5 to 4 μm, particularly preferably 0.5 to 3.5 μm. If the thickness of the layer is less than 0.2 μm, the resulting magnetic recording medium has insufficient bending stiffness (flexural rigidity). If it exceeds 5 μm, the resulting magnetic recording medium has a bending stiffness (flexural rigidity) which is too strong, tending to undergo cupping or curling, which may result in an insufficient contact with a magnetic head.

The magnetic layer, which is an essential constituent layer of the surface layer and is provided on the above-described intermediate layer, is the top layer of the magnetic recording medium, i.e., a layer positioned on the surface of the magnetic recording medium. The magnetic layer is formed by coating the intermediate layer with a magnetic coating composition.

The magnetic coating composition comprises the aforesaid ferromagnetic metal powder and a binder. A composition mainly comprising the ferromagnetic metal powder, binder, and a solvent for the magnetic coating composition is preferably used.

As previously described, the ferromagnetic metal powder is a ferromagnetic metal powder mainly comprising iron and containing 0.8 to 20 parts by weight, preferably 0.8 to 15 parts by weight, more preferably 1.0 to 10 parts by weight, of at least one element selected from Group IIIa elements, inclusive of lanthanides, of the Periodic Table per 100 parts by weight of Fe atoms. The elements of Group IIIa include La, Ce, Pr, Nd, Pm, Sm, Eu, Gd, Tb, Dy, Ho, Er, Tm, Yb, Lu, Sc, Y, etc. These elements can be used individually or as a combination thereof.

Actinide series elements may also be used as an element of Group IIIa either individually or as a mixture with the above-mentioned Sc, Y, etc. at an appropriate mixing ratio.

If the Group IIIa element content is less than 0.8 part by weight per 100 parts by weight of an Fe atom, the ferromagnetic metal powder cannot be prevented sufficiently from fusing together during synthesis, and it is difficult to obtain a magnetic recording medium having sufficient magnetic characteristics, such as coercive force, SFD (switching field distribution), and the like. If the content exceeds 20 parts by weight, the ferromagnetic metal powder exhibits insufficient dispersibility.

The metal content of the ferromagnetic metal powder is at least 50% by weight, and at least 50% by weight of the metal content preferably comprises Fe atoms. It is desirable for the ferromagnetic metal powder to contain 0.5 to 66 parts by weight, particularly 5 to 40 parts by weight of Co atoms, per 100 parts by weight of Fe atoms.

Specific examples of the ferromagnetic metal powders are Fe—Co—Y, Fe—Ni—Y, Fe—Al—Y, Fe—Ni—Al—Y, Fe—Co—Ni—Y, Fe—Ni—Al—Zn—Y, Fe—Al—Si—Y, Fe—Co—La, Fe—Ni—La, Fe—Al—La, Fe—Ni—Al—La, Fe—Co—Ni—La, Fe—Ni—Al—Zn—La, Fe—Al—Si—La, Fe—Co—Al—Y, Fe—Co—Al—La, Fe—Co—Al—Gd, Fe—Co—Nd—Al—Si, Fe—Co—Al—Nd—Y, Fe—Co—Ce—Al, and Fe—Co—La—Y—Al.

The ferromagnetic metal powders preferably have a needle-like (acicular) or spindle-like shape and preferably have a major axis length of 0.03 to 0.2 μm, more preferably 0.03 to 0.12 μm, a specific surface area of 38 to 80 $m^2/g$, more preferably 40 to 70 $m^2/g$, particularly preferably 42 to 68 $m^2/g$, an acicular ratio of 3 to 20, more preferably 3 to 15, and an X-ray measured particle size of 130 to 250 Å, more preferably 130 to 200 Å, particularly preferably 130 to 180 Å. The particle dimensions of the ferromagnetic metal powder, such as a longer axis length, should be adjusted so that the center-line surface roughness of the magnetic layer may fall within the above-specified range.

The water content of the ferromagnetic metal powder is preferably 0.2 to 2.5% by weight, still preferably 0.4 to 2.0% by weight, based on the total weight of the ferromagnetic metal powder.

The ferromagnetic metal powder preferably has a coercive force of 1600 to 2500 Oe, more preferably 1800 to 2400 Oe. If the coercive force of the ferromagnetic metal powder is less than the lower limit, the magnetic layer is liable to demagnetization, resulting in a reduction in the short wavelength RF output. If the coercive force exceeds the upper limit, the head magnetic field may be insufficient, which leads to a shortage of writing ability and ultimately leads to a reduction of overwrite characteristics. Accordingly, the above-described range of coercive force is preferred.

The saturation magnetization of the ferromagnetic metal powder preferably ranges from 100 to 180 emu/g, more preferably 110 to 160 emu/g. If the saturation magnetization of the ferromagnetic metal powder is less than the lower limit, the magnetic flux density in the resulting magnetic recording medium is low, and the output is thus reduced. If the saturation magnetization exceeds the upper limit, the magnetic powder tends to be oxidized during storage to reduce the magnetic flux density, or the mutual action among individual magnetic particles tends to increase and impair dispersibility. It follows that the magnetic particles tend to agglomerate, making it difficult to obtain a desired output. Hence the above-specified range is preferred.

Accordingly, the magnetic layer containing the above-mentioned ferromagnetic metal powder preferably has a coercive force of 1800 to 2400 Oe, more preferably 1800 to 2300 Oe. The saturation flux density of the magnetic layer containing the ferromagnetic metal powder is preferably 3000 to 4500 gauss, more preferably 3200 to 4000 gauss.

If desired, the ferromagnetic metal powder may contain one or more transition metal elements.

In the present invention, the ferromagnetic metal powder may be subjected to a surface treatment for improving the dispersibility in the same manner as the magnetic powder used in the magnetic intermediate layer.

The binder used in the magnetic coating composition for forming the magnetic layer can be selected from those described for the magnetic intermediate coating composition for forming the magnetic intermediate layer.

The binder is preferably used in an amount of about 5 to 100 parts by weight, more preferably 5 to 70 parts by weight, per 100 parts by weight of the magnetic powder.

The solvents used in the magnetic coating composition for forming the magnetic layer are the same as those exemplified as the solvents for the intermediate coating composition. The solvents may be used either individually or as a mixture thereof.

The solvent for the magnetic coating composition is preferably used in an amount of 80 to 500 parts by weight, more preferably 100 to 350 parts by weight, per 100 parts by weight of the magnetic powder.

As the solvent for the magnetic coating composition, the above-described mixed solvent is preferred for use in the magnetic coating composition for forming the magnetic layer, similar to the solvent for use in the intermediate coating composition. The mixed solvent preferably contains the above-described high-boiling solvent or low-volatile solvent, more preferably the above-described high-boiling and low-volatile solvent.

Preferred examples of the high-boiling solvents, low-volatile solvents, and high-boiling and low-volatile solvents to be used here are the same as those exemplified as the solvents for the intermediate coating composition.

It is preferred that the proportion of the high-boiling solvent, low-volatile solvent and/or high-boiling and low-volatile solvent in the mixed solvent falls within the same range as the proportion range described for the solvent for the intermediate coating composition.

It is preferable that the intermediate layer be formed of an intermediate coating composition containing the solvent for the intermediate coating composition which has the above-described high-boiling solvent, and the magnetic layer be formed of a magnetic coating composition containing the solvent for the magnetic coating composition which has the high-boiling solvent, or alternatively, the intermediate layer be formed of an intermediate coating composition containing the solvent for the intermediate coating composition which has the low-volatile solvent, and the magnetic layer be formed of a magnetic coating composition containing the solvent for the magnetic coating composition which has the low-volatile solvent.

If desired, the magnetic coating composition may contain additives generally used in magnetic recording media, such as dispersants, lubricants, abrasives, antistatics, rust inhibitors, antifungals, and hardeners. Specific examples of such additives are the same as those enumerated above for the magnetic intermediate coating composition forming the magnetic intermediate layer.

The magnetic coating composition for the magnetic layer can be prepared by, for example, preliminarily mixing the ferromagnetic metal powder, the binder, and a part of the solvent for the magnetic coating composition in a Naughter mixer, etc., kneading the premixture in a continuous twin-screw kneader, etc., diluting the mixture with another part of the solvent for the magnetic coating composition, followed by dispersing by means of a sand mill, etc., adding additives such as a lubricant to the dispersion, filtering the mixture, and adding to the filtrate a hardener, such as a polyisocyanate, and the remainder of the solvent for the magnetic coating composition.

The degree of dispersion of the ferromagnetic metal powder in the magnetic coating composition (which is related to the surface properties of the resulting magnetic layer, such as center-line surface roughness) is subject to variation depending on the kinds of the compounding components, such as a binder and a dispersant, the compounding ratio, and the like. It is also varied by changing the type of an apparatus used for dispersive mixing and various operational conditions, such as the solids content of the magnetic coating composition, the stirring speed, the shear rate, the retention time (dispersing time), and the like. Further, the surface properties of the resulting magnetic layer also vary depending on the drying conditions for the coating layer at the time of coating and the calendering conditions after coating. Accordingly, the magnetic layer can have its center-line surface roughness, Ra, controlled within the above-specified range by appropriate selection of the compounding components and the conditions of preparation.

The magnetic layer has a thickness of 0.05 to 0.6 µm, preferably 0.08 to 0.5 µm. If the thickness is less than 0.05 µm, uniform coating is difficult, and the resulting layer has a reduced durability. If the thickness exceeds 0.6 µm, thickness loss increases, resulting in considerable reduction in output characteristics and overwrite characteristics.

The center-line surface roughness, Ra, of the magnetic layer is 1 to 5 nm, preferably 1.5 to 4.5 nm, still preferably 2 to 4.2 nm. If Ra is less than 1 nm, the coefficient of friction increases resulting in running troubles. If it exceeds 5 nm, the space loss increases resulting in a reduction of the output characteristics. The term "center-line surface roughness Ra" as used herein means a value obtained by the measurement method described in Examples hereinafter given.

The decay rate, $\Delta Bs$, of the saturation flux density of the magnetic layer is preferably not more than 10%, more preferably not more than 8%, particularly preferably 7.5% or less. If the decay rate, $\Delta Bs$, of the saturation flux density exceeds 10%, the long-term storage characteristics tend to deteriorate. In particular, the influence on the output characteristics and the error rate would be noticeable. Accordingly, the above-specified range is preferred.

The decay rate, $\Delta Bs$, is defined by a rate of change in terms of percent ratio of the saturation flux density Bs' of the magnetic layer after standing at a temperature of 60° C. and 90% relative humidity (RH) for 30 days to the initial saturation flux density, Bs, of the magnetic layer before the standing, i.e., $\Delta Bs=(1-Bs'/Bs) \times 100$. The decay rates, $\Delta Bs$, as used for the magnetic layer represent values obtained by making measurements on magnetic recording media immediately after preparation and also on those which have been used or stored under usual conditions of use or storage.

The saturation flux density decay rate, $\Delta Bs$, of the magnetic layer can be controlled properly by (1) selecting the composition of the metal elements present in the ferromagnetic metal powder used, (2) adjusting the thickness and/or density of a surface oxide layer which may be formed as a surface layer on the ferromagnetic metal particles, (3) adjusting the dispersibility of the magnetic coating composition, or (4) selecting the binder or additives to be used in the magnetic coating composition. The manipulations (1) and (2) produce particularly large effects. For example, ΔBs can be controlled by using a ferromagnetic metal powder prepared by adding Co, etc. as an alloy element in the preparation of the ferromagnetic metal powder.

The ratio of squareness of the magnetic layer is preferably 0.80 to 0.95, more preferably 0.85 to 0.95.

It is desirable that the magnetic layer be formed while the intermediate layer is wet.

The back layer of the magnetic recording medium of the present invention has a backcoating layer which is provided on the reverse side of the nonmagnetic substrate.

As previously stated, the back layer has a residual solvent content of 5 to 800 ppm, preferably 5 to 700 ppm, more preferably 5 to 600 ppm. When the back layer consists solely of a backcoating layer, the backcoating layer should have the above-specified residual solvent content. When the back layer consists of two or more layers inclusive of the backcoating layer, the residual solvent content of the total back layer should fall within the above specific range. It is practically impossible to reduce the residual solvent content lower than 5 ppm. If the residual solvent content exceeds 800 ppm, the magnetic layer and the back layer may stick to each other when the recording medium in the form a recording tape is wound. As a result, the surface of the magnetic layer is roughened. In extreme cases, the magnetic layer tends to come off, or the tape tends to be cut. Further, the magnetic tape tends to undergo curling.

The unit "ppm" as used herein is given by weight.

The backcoating layer, which is an essential constituent layer of the back layer provided on the back side of the nonmagnetic substrate, can be formed, in general, by coating the back side of the nonmagnetic substrate with a backcoating composition. The backcoating composition which is preferably used usually comprises a nonmagnetic powder, a binder, and a solvent for the backcoating composition as main components.

The nonmagnetic powder used in the backcoating composition is not particularly limited as long as it is nonmagnetic. Suitable nonmagnetic powders include particles of carbon black, graphite, titanium oxide, barium sulfate, zinc sulfide, magnesium carbonate, calcium carbonate, zinc oxide, calcium oxide, magnesium oxide, tungsten disulfide, molybdenum disulfide, boron nitride, tin dioxide, silicon dioxide, nonmagnetic chromium oxide, alumina, silicon carbide, cerium oxide, corundum, artificial diamond, nonmagnetic iron oxide, garnet, siliceous stone, silicon nitride, molybdenum carbide, boron carbide, tungsten carbide, titanium carbide, diatomaceous earth, dolomite, and resins. In particular, carbon black, titanium oxide, barium sulfate, calcium carbonate, alumina, and nonmagnetic iron oxide are preferred. The particle size of the nonmagnetic powder is adjusted so that the center-line surface roughness of the backcoating layer may fall within the above-specified range.

The nonmagnetic powder preferably comprises fine carbon black particles having an average particle size of 0.01 to 0.03 μm and coarse carbon black particles having an average particle size of 0.05 to 0.1 μm. A preferred weight ratio of the fine carbon black particles and the coarse carbon black particles is 97:3 to 90:10. The backcoating layer having such a nonmagnetic powder composition is preferred for the reasons that: the output of the magnetic recording medium can be further improved; the surface profile of the backcoating layer is prevented from being transferred to the surface of the magnetic layer while the magnetic recording medium is stored; and as a result, deterioration in recording and reproduction characteristics which may take place during storage can be further suppressed. Such a preferred backcoating layer can be formed by compounding the above-described fine carbon black particles and the coarse carbon black particles at the above-described mixing ratio into the backcoating composition.

Next, the binder and the solvent used for the backcoating composition will be described.

The binder which can be used in the backcoating composition is not limited, and any of those commonly employed in magnetic recording media can be used. For example, the binders enumerated above for use in the magnetic intermediate coating composition for forming the magnetic intermediate layer can be used, while not limiting. The binders may be used either individually or as a mixture of two or more thereof.

The binder is preferably used in an amount of 15 to 250 parts by weight, more preferably 50 to 200 parts by weight, particularly preferably 70 to 150 parts by weight, per 100 parts by weight of the nonmagnetic powder.

As a solvent for use in the backcoating composition, while any of solvents commonly employed in magnetic recording media can be used with no particular limitation, the same solvents as those exemplified as the solvents for the intermediate coating composition are preferably used. The solvents may be used either individually or as a mixture of two or more thereof.

The solvent for the backcoating composition is preferably used in an amount of 100 to 900 parts by weight, more preferably 120 to 750 parts by weight, per 100 parts by weight of the total amount of the nonvolatile content of the nonmagnetic powder and the binder, etc.

As the solvent for the backcoating composition, the aforesaid mixed solvent is preferred for use in the backcoating composition, similar to the solvent for use in the intermediate coating composition. The mixed solvent can contain the above-described high-boiling solvent, low-volatile solvent, or high-boiling and low-volatile solvent.

Examples of the high-boiling solvents, low-volatile solvents, and high-boiling and low-volatile solvents to be used here are the same as those exemplified as the solvents for the intermediate coating composition.

When the mixed solvent contains the high-boiling solvent, low-volatile solvent or high-boiling and low-volatile solvent, it is preferred that the proportion of these solvents in the mixed solvent also falls within the same range as the proportion range described for the solvent for the intermediate coating composition.

The backcoating composition can be prepared by, for example, preliminarily mixing the nonmagnetic powder, the binder, and a part of the solvent for the backcoating composition in a Naughter mixer, etc., kneading the premixture in a continuous twin-screw kneader, etc., diluting the mixture with another part of the solvent for the backcoating composition, followed by dispersing by means of a sand mill, etc., adding additives to the dispersion, filtering the mixture, and adding to the filtrate a hardener, such as a polyisocyanate, and the remainder of the solvent for the backcoating composition.

The degree of dispersion of the nonmagnetic powder in the backcoating composition (which is related to the surface properties of the resulting backcoating layer, such as centerline surface roughness) is subject to variation depending on the kinds of the compounding components, such as a binder and a dispersant, the compounding ratio, and the like. It is also varied by changing the type of an apparatus used for dispersive mixing and various operational conditions, such as the solids content of the backcoating composition, the stirring speed, the shear rate, the retention time (dispersing time), and the like. Further, the surface properties of the resulting backcoating layer also vary depending on the drying conditions of the coating layer and the conditions of calendering carried out, if desired, after coating and drying. Accordingly, the backcoating layer can have its center-line surface roughness, Ra, controlled within the above-specified range by appropriate selection of the compounding components and the conditions of preparation.

The backcoating composition thus prepared from the above-described components may be applied to the nonmagnetic substrate by any known coating means and dried to provide any backcoating layer. For prevention of curling, the backcoating layer preferably has a thickness of 0.3 to 2.0 µm, more preferably 0.4 to 1.0 µm, particularly preferably 0.5 to 0.8 µm.

The backcoating layer has a center-line surface roughness, Ra, of 2 to 8 nm, preferably 2 to 7 nm, more preferably 2.5 to 6 nm. If Ra is less than 2 nm, the coefficient of friction increases resulting in running troubles. If it exceeds 8 nm, the surface profile (unevenness) of the backcoating layer will be transferred to the surface of the magnetic layer during storage of the magnetic recording medium, which causes deterioration of recording and reproduction characteristics.

The thickness of the magnetic recording medium of the present invention, i.e., the total thickness of the nonmagnetic substrate 2, the surface layer 10, and the back layer 20 of FIG. 1, preferably ranges from 3 to 10 µm, more preferably 4 to 9.5 µm, particularly preferably 4 to 9 µm. If the thickness of the magnetic recording medium is less than 3 µm, the medium has insufficient bending stiffness. As a result, it may be difficult to obtain a secure contact with a head, or the medium may be stretched under tension and fail to restore due to a large residual elongation. If the thickness exceeds 10 µm, the reel length of the magnetic recording medium that can be put in a cassette must be reduced, i.e., the recording capacity per unit volume is reduced. Accordingly, the above-described thickness range is preferred.

The magnetic recording medium of the present invention preferably has a bending stiffness of $7\times10^{-4}$ to $4.2\times10^{-3}$ N·mm$^2$, more preferably $7.5\times10^{-4}$ to $3\times10^{-3}$ N·mm$^2$. If the bending stiffness is less than $7\times10^{-4}$ N·mm$^2$ or more than $4.2\times10^{-3}$ N·mm$^2$, the contact with a head tends to be unsatisfactory.

The terminology "bending stiffness" as used herein means a value as measured on a 3.81 mm wide tape in accordance with the measurement method used in Examples hereinafter described.

The magnetic recording medium of the present invention preferably has a Young's modulus, E, of 5 to 15 kN/mm$^2$, more preferably 7 to 14 kN/mm$^2$. If the Young's modulus, E, is less than 5 kN/mm$^2$ or more than 15 kN/mm$^2$, the bending stiffness will be improper, tending to result in an unsatisfactory contact with a head.

A particularly preferred magnetic recording medium according to the present invention has a saturation flux density decay ratio, ΔBs, of not more than 10%, a thickness of 3 to 10 µm, and a bending stiffness of $7\times10^{-4}$ to $4.2\times10^{-3}$ N·mm$^2$.

The magnetic recording medium of the present invention is suitable for use as magnetic tapes, such as a 8 mm video tape or a DAT tape.

The method for producing the magnetic recording medium of the present invention is described below. In what follows, the explanation will be made with particular reference to, as an example, a magnetic recording medium in which the surface layer is composed of an intermediate layer and a magnetic layer and the back layer is composed of a backcoating layer.

An intermediate coating composition for forming an intermediate layer (either magnetic or nonmagnetic intermediate coating composition) and a magnetic coating composition for forming a magnetic layer are simultaneously applied to a nonmagnetic substrate by wet-on-wet coating to form an intermediate layer and a magnetic layer of the above-mentioned respective dry thickness. That is, it is preferable to form the magnetic layer while the intermediate layer is wet.

The coating layer is then subjected to orientation in a magnetic field, dried, and calendered. A backcoating composition is then applied to the back side of the nonmagnetic substrate and dried to form a backcoating layer. If desired, for example, in the production of a magnetic tape, the coated film is subjected to aging at 40° to 70° C. for 6 to 72 hours, followed by slitting to desired width.

The above-mentioned simultaneous coating technique is described in Japanese Patent Application Laid-Open 5-73883, column 42, line 31 to column 43, line 31, which is incorporated herein by reference. This is a technique in which a magnetic coating composition forming a magnetic layer is applied before an intermediate coating composition forming an intermediate layer dries. According to this technique, a smooth interface between the intermediate layer and the magnetic layer and also satisfactory surface properties for the magnetic layer are secured. There is provided, as a result, a magnetic recording medium which causes few dropouts and can cope with high-density recording, the coating layer (inclusive of the intermediate layer and the magnetic layer) of which has excellent durability.

The magnetic orientation treatment is performed before the intermediate coating composition and the magnetic coating composition dry. For example, in the case of preparing a magnetic tape, the treatment can be carried out by a method comprising application of a magnetic field of about 500 Oe or more, preferably about 1000 to 10000 Oe, in parallel with the coated side or a method comprising passing the coating layer through a solenoid type magnet of 1000 to 10000 Oe while the coating compositions are wet.

The calendering of the coating layer is carried out by, for example, supercalendering comprising passing the coated film between two rolls, such as a combination of a metal roll and a cotton roll or a synthetic resin roll, or a combination of two metal rolls.

The drying of the coating layer of the intermediate coating composition, magnetic coating composition, and backcoating composition is carried out by, for example, contacting the recording medium with heated gas (hot air). The degree of drying can be controlled by adjusting the temperature and the feed rate (flow speed) of hot air.

If desired, the resulting magnetic recording medium may be subjected to finishing, such as polishing and cleaning of the magnetic layer. Application of the intermediate coating composition and the magnetic coating composition can also be conducted by a generally known successive coating technique.

The magnetic recording medium of the present invention is not particularly limited, provided that the magnetic layer contains the above-described specific ferromagnetic metal powder and that the residual solvent contents of the surface layer and the back layer, the thickness of the magnetic layer, and the center-line surface roughnesses of the magnetic layer and the backcoating layer are within the respective specific ranges. The residual solvent content and the center-line surface roughness can be controlled within the respective ranges as follows.

The residual solvent contents in the surface layer and the back layer can be controlled within the above respective ranges by appropriately selecting the solvent composition in the coating composition forming the respective layer, the coating speed and drying conditions (e.g., air flow speed, temperature, etc.).

A preferred solvent composition contains at least one of the above-described high-boiling solvents, low-volatile solvents, and/or the high-boiling and low-volatile solvents, such as cyclohexanone. That is, it is preferred that the magnetic coating composition and the intermediate coating composition include the above-mentioned mixed solvent.

A preferred coating speed is 50 to 800 m/min.

Preferred drying conditions are contact with hot air at a temperature of 40° to 120° C., 5 to 35 m/sec in air flow speed, and 1 to 60 seconds in drying time.

The center-line surface roughness of the magnetic layer and the backcoating layer can be controlled within the above respective ranges, for example, by the method disclosed in Japanese Patent Publication 4-79046, which is incorporated herein by reference, or the like. More specifically, such control can be conducted by appropriately selecting the particle size of the ferromagnetic metal powder or the nonmagnetic powder in the respective coating compositions and the degree of the dispersion of the particles and, in addition, the solvent composition of the respective coating compositions, the drying conditions of the coating layer (e.g., air flow speed, temperature, etc.), the calendering conditions (e.g., speed, pressure, roll surface temperature, etc.), and the like.

A preferred solvent composition contains at least one of the above-described high-boiling solvents, low-volatile solvents, and/or the high-boiling and low-volatile solvents, such as cyclohexanone. That is, it is preferred that the magnetic coating composition and the intermediate coating composition include the above-mentioned mixed solvent. Preferred drying conditions are contact with hot air at a temperature of 40° to 120° C., 5 to 35 m/sec in air flow speed, and 1 to 60 seconds in drying time. Preferred calendering conditions are 50 to 300 m/min in speed, 50 to 450 kg/cm in pressure, and 60° to 120° C. in roll temperature.

The present invention will now be illustrated in greater detail with reference to Examples and Comparative Examples, but it should be understood that the present invention is not construed as being limited thereto. Unless otherwise indicated, all the parts, percents, and ratios are given by weight.

EXAMPLE 1

A magnetic tape was prepared as a magnetic recording medium in accordance with the method described below. A magnetic coating composition A, a magnetic intermediate coating composition (a), and a backcoating composition (i) having the following formulations were used to provide a magnetic tape comprising (I) a surface layer having an intermediate layer formed of the composition (a) and a magnetic layer formed of the magnetic composition A and (II) a back layer having a backcoating layer formed of the composition (i).

The magnetic layer formed of the magnetic coating composition A was found to have a coercive force of 1880 Oe and a saturation flux density of 3760 gauss, as measured according to the measurement methods hereinafter described.

Magnetic Coating Composition A

| | |
|---|---|
| • Acicular ferromagnetic metal powder comprised mainly of iron (Fe:Al:Y:Co:Ca = 85:4:2:8:1; coercive force: 1820 Oe; saturation magnetization: 136 emu/g; average major axis length: 0.11 µm; specific surface area*: 58 m²/g; X-ray measured particle size: 150 Å; water content*: 1.1% (based on metal powder) *Measured according to the measurement methods hereinafter described (hereinafter the same).) | 100 parts |
| • Alumina (average particle size: 0.3 µm) | 8 parts |
| • Carbon black (average primary particle size: 20 nm) | 2 parts |
| • MR-110 (a trade name of a vinyl chloride copolymer containing a sulfoxyl group (—SO₃Na, —SO₃K), produced by Nippon Zeon Co., Ltd.) | 10 parts |
| • UR-8700 (a trade name of a polyurethane resin containing a sulfoxyl group (—SO₃Na), produced by Toyobo Co., Ltd.) | 23 parts |
| • 2-Ethylhexyl stearate | 2 parts |
| • Palmitic acid | 2 parts |
| • Coronate-L (a trade name of a polyisocyanate compound, produced by Nippon Polyurethane Industry Co., Ltd.) | 4 parts |
| • Methyl ethyl ketone | 120 parts |
| • Toluene | 80 parts |
| • Cyclohexanone | 40 parts |

Magnetic Intermediate Coating Composition (a)

| | |
|---|---|
| • Mn—Zn Ferrite powder (saturation magnetization: 62 emu/g; coercive force: 64 Oe; average particle size: 0.04 µm; specific surface area: 45 m²/g; water content: 0.6% (based on the Mn—Zn ferrite powder)) | 100 parts |
| • Carbon black (average primary particle size: 20 nm) | 2 parts |
| • MR-110 (a trade name of a vinyl chloride copolymer containing a sulfoxyl group, produced by Nippon Zeon Co., Ltd.) | 10 parts |
| • UR-8700 (a trade name of a polyurethane resin containing a sulfoxyl group, produced by Toyobo Co., Ltd.) | 23 parts |
| • 2-Ethylhexyl stearate | 2 parts |
| • Palmitic acid | 1 part |
| • Coronate-L (a trade name of a polyisocyanate compound, produced by Nippon Polyurethane Industry Co., Ltd.) | 4 parts |
| • Methyl ethyl ketone | 84 parts |
| • Toluene | 56 parts |
| • Cyclohexanone | 28 parts |

Backcoating Composition (i)

| | |
|---|---|
| • Fine carbon black particles (average primary particle size: 0.018 µm) | 38.5 parts |
| • Coarse carbon black particles (average primary particle size: 0.075 µm) | 1.5 parts |
| • Nipporan 2301 (a trade name of polyurethane, produced by Nippon Polyurethane Industry Co., Ltd.) | 50 parts |
| • Celnova BTH 1/2 (a trade name of nitrocellulose, produced by Asahi Chemical Industry Co., LTD., Solid Content: 70%) | 28.6 parts |
| • Polyisocyanate (trade name: D-250N, produced by Takeda Chemical Industries, Ltd.) | 4 parts |
| • Copper phthalocyanine | 5 parts |
| • Stearic acid | 1 part |
| • Methyl ethyl ketone | 140 parts |
| • Toluene | 140 parts |
| • Cyclohexanone | 140 parts |

Preparation of Magnetic Recording Medium

The magnetic coating compositions A and the magnetic intermediate coating composition (a) were simultaneously applied to a 4.5 µm thick aramid film at a line speed of 100 m/min, to form a surface layer composed of a magnetic layer and an intermediate layer with a dry thickness (after calendering) of 0.2 µm and 1.3 µm, respectively. While wet, the coating layer was subjected to magnetic field orientation by passing through a solenoid type magnet of 5000 Oe, and dried for 30 seconds in a drier where hot air of 90° C. was fed at a speed of 15 m/sec, and taken up. The coated film was calendered at 90° C. and 350 kg/cm to form a magnetic layer and an intermediate layer. The opposite side of the nonmagnetic substrate was then coated with the backcoating composition (i) to a dry thickness of 0.5 µm, dried at 90° C. to form a backcoating layer as a back layer, and taken up. Immediately thereafter, the coated film was slit into a 3.81 mm wide strip, and the surface and back layers were cleaned with nonwoven cloth to obtain a magnetic recording tape. 120 meters of the resulting tape was put into a cassette case to prepare a DDS-2 (DAT tape for data recording) cassette for evaluation. The above coating and calendering were carried out on the same line (in-line system).

The resulting magnetic tape was tested to evaluate ratio of squareness, decay rate ΔBs of saturation flux density, Young's modulus E, bending stiffness, residual solvent content, center-line surface roughness Ra, C/N characteristics, and durability (ratio of change in error rate) in accordance with the following methods. The results obtained are shown in Table 1 below.

Measurement Methods

1) Specific surface area of powder

Measured according to a BET one point method with Micromeritix Flosobe Model 2300 (fluidized type automatic specific surface area measuring apparatus, manufactured by Shimadzu Corp.) under conditions of:

Sample: 0.1 to 0.5 g

Degassing: 105° C.×30 minutes

Gas feed: nitrogen/helium=70/30 (by mole)

2) Water content of powder

Measured with a trace water content measuring apparatus according to Karl Fischer's method equipped with an automatic vaporizer.

3) Coercive force, saturation flux density, and ratio of squareness

When a sample magnetic tape has a nonmagnetic intermediate layer, the tape, as it was, was punched into a test piece of prescribed dimension. The coercive force, saturation magnetization, and ratio of squareness of the test piece thus prepared were measured with a vibrating sample magnetometer (VSM) with an applied magnetic field of 10 kOe. When the intermediate layer was a magnetic layer, only the magnetic layer was stripped off the sample tape by using an adhesive tape and punched into a test piece of prescribed dimension. When it is difficult to apply such a treatment, a separate magnetic recording medium having only the magnetic layer was prepared by coating the same substrate as used in the sample tape with the same magnetic coating composition under the same conditions as used in the sample tape and calendering, and the resulting tape was punched into a test piece of prescribed dimension. The coercive force, saturation magnetization, and ratio of squareness of the test piece thus prepared were measured with a vibrating sample magnetometer (VSM) with an applied magnetic field of 10 kOe similarly to the case where the intermediate layer is a nonmagnetic intermediate layer.

Further, a magnetic tape was sliced to a width of about 0.1 µm with a diamond cutter, and the photograph of the slice was taken with a transmission electron microscope (TEM) at magnifications of 10,000 to 100,000. The thickness of the magnetic layer was measured from the resulting micrograph. The saturation flux density was obtained from the measured magnetic layer thickness, area of the test piece, and saturation magnetization of the test piece.

4) Saturation flux density decay rate, ΔBs

When the intermediate layer of a sample magnetic tape was a nonmagnetic layer, the tape as prepared was punched into a test piece of prescribed dimension. The saturation magnetization (Ms) of the test piece thus prepared was measured with a vibrating sample magnetometer with an applied magnetic field of 10 kOe. When the intermediate layer was a magnetic layer, only the magnetic layer was stripped off the sample magnetic tape by using an adhesive tape and punched into a test piece of prescribed dimension. When it is difficult to apply such a treatment, a separate magnetic recording medium having only the magnetic layer was prepared by coating the same nonmagnetic substrate as the nonmagnetic substrate used in the sample magnetic tape only with the same magnetic coating composition under the same conditions as used in the sample magnetic tape and calendering, and the resulting tape was punched into a test piece of prescribed dimension. The saturation magnetization (Ms) of the test piece thus prepared was measured with a vibrating sample magnetometer. Then, the test piece was allowed to stand at 60° C. and 90% RH for 30 days, and the saturation magnetization (Ms') was measured again. Taking Ms'/Ms as Bs'/Bs, the decay rate, ΔBs, of saturation flux density of the magnetic layer was obtained from the equation: $\Delta Bs=(1-Bs'/Bs)\times 100$.

5) Young's modulus, E

A 180 mm long test piece was cut out of a sample magnetic tape. A tensile test was carried out by clamping the test piece at a distance of 100 mm and pulling at a pulling speed of 5 mm/min. The elongation under a load between 0.5N and 1.5N (load change ΔF) was expressed in terms of ΔL/L (elongation/distance between clamps), and a Young's modulus, E, was obtained from the equation:

$$E=\Delta F/(WT\cdot \Delta L/L)$$

wherein W is the width of the test piece (3.81 mm); and T is the thickness of the test piece (mm).

6) Bending stiffness

The flexural rigidity was obtained from the above-measured Young's modulus according to the following equation and was taken as the bending stiffness. The equation is given in Standard ECMA-198, 2nd Ed. (June, 1995), Ch. 7.12 "3.81 mm Wide Magnetic Tape Cartridge for Information Interchange-Helical Scan Recording-DDS-2 Format using 120 m Length Tapes", which is incorporated herein by reference.

Flexural rigidity=$E \cdot WT^3/12$ wherein E is the Young's modulus; W is the width of the test piece (3.81 mm); and T is the thickness of the test piece (mm).

7) Residual solvent content

The residual solvent contents in the surface layer (inclusive of the intermediate layer and the magnetic layer) and the back layer (i.e., the backcoating layer) of a magnetic tape immediately after slitting were obtained as follows. For measurement of the residual solvent content of the surface layer, the back layer was removed from a sample tape by stripping using an adhesive tape or scraping with a cotton applicator impregnated with acetone to prepare a tape having the surface layer only. For measurement of the residual solvent content of the back layer, the surface layer was removed from a sample tape by stripping using an adhesive tape or scraping with a cotton applicator impregnated with acetone to prepare a tape having the back layer only. The resulting tape in which only the surface layer was present or the resulting tape in which only the back layer was present was put in a sample tube for head space gas chromatography, and gas chromatography was performed under the following conditions to measure the solvent concentration. The area of the surface layer or back layer was about 30 cm². The weight of the surface layer only or the back layer only was obtained by subtracting the weight of the substrate from the weight of the tape having the surface layer or the back layer, respectively.

Conditions of Gas Chromatography

Sample temperature: 140° C.

Needle temperature: 165 ° C.

Injection time: 30 seconds

Column: DB-1 (Trade Name) manufactured by J & W (inner diameter: 0.25 mm; length: 30 m; stationary phase: 0.25 μm)

Column temperature: 60° to 70° C.

Detector: FID method

Detection temperature: 220° C.

Carrier gas: He, 14 psi

The residual solvent content was obtained from the resulting chromatogram corrected based on the results of measurement on a standard solution. The residual solvent content thus obtained is a total residual content of methyl ethyl ketone, toluene, and cyclohexanone.

8) Center-line surface roughness, Ra

A test piece of appropriate size cut out of a sample magnetic tape was fixed on a glass plate for an optical microscope with an adhesive tape taking care not to cause wrinkles. Measurement was made with a "Laser Interferometric Microscope Maxim 3D Model 5700" (trade name) manufactured by Zygo Co. by using program "Maxim Advanced Texture Application".

Conditions of Zygo measurements

Lens: Fezeau Lens (Magnification=40 times)

Cut-off frequency: 4.236 1/mm (cut-off wavelength: 0.235 mm)

Removed: cylinder

Trimmed: 0

The center-line surface roughness, Ra, for both the magnetic layer and the backcoating layer of the test piece (before storage) was calculated according to the following equation.

$$Ra = \sum_{i=1}^{N} y_i/N.$$

wherein yi is the i'th absolute value of deviation from the center-line when the sampling length is divided into N.

The center-line surface roughness (Ra) was also measured after the sample magnetic tape was stored at 60° C. and 90% RH for 30 days (after storage).

9) C/N Characteristics

A signal wave of 0.67 μm was recorded on a cassette for evaluation using a DDS-2 drive (DAT drive for data recording). The reproduced output (C) was observed with a spectrum analyzer, and a C/N ratio was obtained taking the noise level at wavelength of 0.72 μm as a noise level (N) (C/N characteristics before storage). The C/N characteristics after storage were also obtained after the cassette was stored at 60° C. and 90% RH for 30 days. The before storage C/N of Comparative Example 1 was taken as standard.

[0107]

10) Storage stability (Ratio of change in error rate)

Error rates were measured by using a DDS-2 drive for the entire length of the tape of a sample cassette, and the average error rate was taken as an error rate before storage. Error rates were measured to obtain an average error rate (an average of the entire length) in the same manner after the cassette was stored at 60° C. and 90% RH for 30 days, and the average error rate was taken as an error rate after storage. A ratio of change in error rate is give n by (Error rate after storage)/(error rate before storage), from which the storage stability of the tape can be evaluated. The smaller the rise in error rate, the more satisfactory in storage stability.

Hereinafter, other Examples and Comparative Examples will be described.

In the following Examples and Comparative Examples, the temperature and flow speed of hot air and the drying time were appropriately adjusted so that the surface layer and the back layer might have their respective residual solvent contents as shown in Table 1 below.

EXAMPLE 2

A magnetic tape was prepared in the same manner as in Example 1, except that the intermediate layer (magnetic intermediate layer) was formed by using a magnetic intermediate coating composition (b) having the following formulation in place of the magnetic intermediate coating composition (a). A cassette for evaluation was prepared using the resulting magnetic tape in the same manner as in Example 1. The resulting magnetic tape and the cassette for evaluation were tested and evaluated in the same manner as in Example 1. The results obtained are shown in Table 1 below.

Magnetic Intermediate Coating Composition (b)

| | |
|---|---|
| • Co-coated FeO$_x$ powder (4/3 ≤ x < 3/2) (saturation magnetization: 81 emu/g; coercive force: 910 Oe; average major axis length: 0.2 μm; acicular ratio: 10; specific surface area: 38 m²/g; water content: 0.4% (based on the Co-coated FeO$_x$ powder)) | 100 parts |

-continued

| | |
|---|---|
| • Carbon black (average primary particle size: 20 nm) | 2 parts |
| • MR-110 (a trade name of a vinyl chloride copolymer containing a sulfoxyl group, produced by Nippon Zeon Co., Ltd.) | 10 parts |
| • UR-8700 (a trade name of a polyurethane resin containing a sulfoxyl group, produced by Toyobo Co., Ltd.) | 23 parts |
| • 2-Ethylhexyl stearate | 2 parts |
| • Palmitic acid | 1 part |
| • Coronate-L (a trade name of a polyisocyanate compound, produced by Nippon Polyurethane Industry Co., Ltd.) | 4 parts |
| • Methyl ethyl ketone | 90 parts |
| • Toluene | 60 parts |
| • Cyclohexanone | 30 parts |

EXAMPLE 3

A magnetic tape was prepared in the same manner as in Example 1, except for applying the magnetic coating composition A to form a magnetic layer having a dry thickness of 0.15 μm and applying a magnetic intermediate coating composition (c) having the following formulation in place of the magnetic intermediate coating composition (a) to form an intermediate layer (magnetic intermediate layer) having a dry thickness of 1.35 μm. A cassette for evaluation was prepared using the resulting magnetic tape in the same manner as in Example 1. The resulting magnetic tape and the cassette were tested and evaluated in the same manner as in Example 1. The results obtained are shown in Table 1 below.

Magnetic Intermediate Coating Composition (c)

| | |
|---|---|
| • Hexagonal ferrite powder (hexagonal barium ferrite powder; coercive force: 1680 Oe; saturation magnetization: 57 emu/g; average tabular diameter: 0.04 μm; aspect ratio: 3; specific surface area: 39 m²/g; water content: 1.2% (based on the hexagonal barium ferrite powder)) | 50 parts |
| • Acicular α-Fe₂O₃ powder (major axis length: 0.15 μm; acicular ratio: 8; specific surface area: 52 m²/g; water content: 0.6% (based on the acicular α-Fe₂O₃ powder)) | 50 parts |
| • Alumina (average particle size: 0.3 μm) | 7 parts |
| • Carbon black (average primary particle size: 20 nm) | 2 parts |
| • Vinyl chloride copolymer (trade name: MR-110, produced by Nippon Zeon Co., Ltd.) | 11 parts |
| • UR-8200 (a trade name of a polyurethane resin produced by Toyobo Co., Ltd.) | 13 parts |
| • Coronate HX (a trade name of a polyisocyanate compound, produced by Nippon Polyurethane Industry Co., Ltd.) | 3 parts |
| • Butyl stearate | 2 parts |
| • Myristic acid | 2 parts |
| • Methyl ethyl ketone | 84 parts |
| • Toluene | 56 parts |
| • Cyclohexanone | 28 parts |

EXAMPLE 4

A magnetic tape was prepared in the same manner as in Example 1, except for applying the magnetic coating composition A to form a magnetic layer having a dry thickness of 0.1 μm and applying a magnetic intermediate coating composition (d) having the following formulation in place of the magnetic intermediate coating composition (a) to form an intermediate layer (nonmagnetic intermediate layer) having a dry thickness of 1.4 μm. A cassette for evaluation was prepared using the resulting magnetic tape in the same manner as in Example 1. The resulting magnetic tape and the cassette were tested and evaluated in the same manner as in Example 1. The results obtained are shown in Table 1 below.

Nonmagnetic Intermediate Coating Composition (d)

The same formulation as the magnetic intermediate coating composition (a), except for replacing the Mn—Zn ferrite powder with TiO₂ powder ("TTO-55B" (trade name), produced by Ishihara Sangyo Kaisha, Ltd.; specific surface area: 37 m²/g; water content: 0.5% based on the TiO₂ powder).

EXAMPLE 5

A magnetic tape was prepared in the same manner as in Example 1, except for replacing the magnetic intermediate coating composition (a) with a nonmagnetic intermediate coating composition (e) having the following formulation to form an intermediate layer (nonmagnetic intermediate layer). A cassette for evaluation was prepared using the resulting magnetic tape in the same manner as in Example 1. The resulting magnetic tape and the cassette were tested and evaluated in the same manner as in Example 1. The results obtained are shown in Table 1 below.

Nonmagnetic Intermediate Coating Composition (e)

The same formulation as the magnetic intermediate coating composition (a), except for replacing the Mn—Zn ferrite powder with acicular α—Fe₂O₃ powder ("DPN-250BX" (trade name) produced by Toda Kogyo Corporation; major axis length: 0.15 μm; minor axis length: 0.023 μm; specific surface area: 53 m²/g; water content: 0.8% based on the acicular α—Fe₂O₃ powder).

EXAMPLE 6

A magnetic tape was prepared in the same manner as in Example 1, except for replacing the magnetic coating composition A with a magnetic coating composition B having the following formulation to form a magnetic layer and replacing the magnetic intermediate coating composition (a) with the above-described nonmagnetic intermediate coating composition (e) to form an intermediate layer (nonmagnetic intermediate layer). A cassette for evaluation was prepared using the resulting magnetic tape in the same manner as in Example 1. The resulting magnetic tape and the cassette were tested and evaluated in the same manner as in Example 1. The results obtained are shown in Table 1 below.

The coercive force and saturation flux density of the magnetic layer formed of the magnetic coating composition B were 2320 Oe and 3840 gauss, respectively, as measured according to the measuring method described in Example 1.

Magnetic Coating Composition B

The same formulation as the magnetic coating composition A except for replacing the ferromagnetic metal powder as used in Example 1 with a ferromagnetic metal powder mainly comprising iron and having a spindle shape, an Fe:Al:La:Co:Ba ratio of 74:4.5:2.5:17:2, a coercive force of 2240 Oe, a saturation magnetization of 141 emu/g, an average major axis length of 0.065 μm, a specific surface area of 63 m²/g, an X-ray measured particle size of 142 Å, and a water content of 0.85% based on the metal powder.

EXAMPLE 7

A magnetic tape having a magnetic layer and an intermediate layer as a surface layer and a backcoating layer as a back layer was prepared in the same manner as in Example 6, and the surface layer and the back layer were further dried at a hot air temperature of 80° C. and an air flow speed of 15 m/sec for 45 seconds. A cassette for evaluation was prepared using the resulting magnetic tape in the same manner as in Example 1. The resulting magnetic tape and the cassette were tested and evaluated in the same manner as in Example 1. The results obtained are shown in Table 1 below.

EXAMPLE 8

The surface layer and the back layer of a magnetic tape prepared and dried in the same manner as in Example 7 were further dried at a hot air temperature of 90° C. and an air flow speed of 15 m/sec for 45 seconds. A cassette for evaluation was prepared using the resulting magnetic tape in the same manner as in Example 1. The resulting magnetic tape and the cassette were tested and evaluated in the same manner as in Example 1. The results obtained are shown in Table 1 below.

EXAMPLE 9

A magnetic tape was prepared in the same manner as in Example 8, except for forming the magnetic layer by using a magnetic coating composition C having the following formulation in place of the magnetic coating composition B. A cassette for evaluation was prepared using the resulting magnetic tape in the same manner as in Example 1. The resulting magnetic tape and the cassette were tested and evaluated in the same manner as in Example 1. The results obtained are shown in Table 1 below.

The coercive force and saturation flux density of the magnetic layer formed of the magnetic coating composition C were 2310 Oe and 3670 gauss, respectively, as measured according to the measuring method described in Example 1.
Magnetic Coating Composition C The same formulation as the magnetic coating composition A except for replacing the ferromagnetic metal powder as used in the magnetic coating composition A with an acicular ferromagnetic metal powder mainly comprising iron and having an Fe:Al:Y:Co:Nd:Ba ratio of 69:4:5:20:1:1, a coercive force of 2230 Oe, a saturation magnetization of 132 emu/g, an average major axis length of 0.065 µm, a specific surface area of 61 m$^2$/g, an X-ray measured particle size of 145 Å, and a water content of 0.8% based on the metal powder.

Comparative Example 1

A magnetic tape was prepared in the same manner as in Example 1, except for replacing the magnetic coating composition A with a magnetic coating composition D having the following formulation to form a magnetic layer. A cassette for evaluation was prepared using the resulting magnetic tape in the same manner as in Example 1. The resulting magnetic tape and the cassette were tested and evaluated in the same manner as in Example 1. The results obtained are shown in Table 2 below.

The coercive force and saturation flux density of the magnetic layer formed of the magnetic coating composition D were 1890 Oe and 3960 gauss, respectively, as measured according to the measuring method described in Example 1.
Magnetic Coating Composition D The same formulation as the magnetic coating composition A except for replacing the ferromagnetic metal powder as used in the magnetic coating composition A with a spindle-shape ferromagnetic metal powder mainly comprising iron and having an Fe:Al:Si:Co:Ba ratio of 74:4:2:17:2, a coercive force of 1830 Oe, a saturation magnetization of 148 emu/g, an average major axis length of 0.13 µm, a specific surface area of 49 m$^2$/g, an X-ray measured particle size of 165 Å, and a water content of 0.95% based on the metal powder.

Comparative Example 2

A magnetic tape was prepared in the same manner as in Example 1, except for replacing the magnetic coating composition A with the above-described magnetic coating composition D to form a magnetic layer and replacing the magnetic intermediate coating composition (a) with the nonmagnetic intermediate coating composition (d) to form an intermediate layer (nonmagnetic intermediate layer). A cassette for evaluation was prepared using the resulting magnetic tape in the same manner as in Example 1. The resulting magnetic tape and the cassette were tested and evaluated in the same manner as in Example 1. The results obtained are shown in Table 2 below.

Comparative Example 3

A magnetic tape was prepared in the same manner as in Example 1, except for applying the magnetic coating composition A to form a magnetic layer having a dry thickness of 1.5 µm and forming no intermediate layer to provide a surface layer having a single layer structure consisting solely of the magnetic layer. A cassette for evaluation was prepared using the resulting magnetic tape in the same manner as in Example 1. The resulting magnetic tape and the cassette were tested and evaluated in the same manner as in Example 1. The results obtained are shown in Table 2 below.

Comparative Example 4

A magnetic tape was prepared in the same manner as in Example 2, except that the calendering was carried out at a temperature of 80° C. A cassette for evaluation was prepared using the resulting magnetic tape in the same manner as in Example 1. The resulting magnetic tape and the cassette were tested and evaluated in the same manner as in Example 1. The results obtained are shown in Table 2 below.

Comparative Example 5

A magnetic tape was prepared in the same manner as in Example 3, except for replacing the backcoating composition (i) with a backcoating composition (ii) having the following formulation to form a backcoating layer. A cassette for evaluation was prepared using the resulting magnetic tape in the same manner as in Example 1. The resulting magnetic tape and the cassette were tested and evaluated in the same manner as in Example 1. The results obtained are shown in Table 2 below.
Backcoating Composition (ii)

The same formulation as the backcoating composition (i) except for changing the amount of the fine carbon black particles and the coarse carbon black particles to 32 parts and 8 parts, respectively.

Comparative Example 6

A magnetic tape was prepared in the same manner as in Example 5, except that the residual solvent content of the surface layer was adjusted to 1200 ppm. A cassette for evaluation was prepared using the resulting magnetic tape in the same manner as in Example 1. The resulting magnetic tape and the cassette were tested and evaluated in the same manner as in Example 1. The results obtained are shown in Table 2 below.

Comparative Example 7

A magnetic tape was prepared in the same manner as in Example 6, except that the residual solvent content of the back layer was adjusted to 900 ppm. A cassette for evaluation was prepared using the resulting magnetic tape in the same manner as in Example 1. The resulting magnetic tape and the cassette were tested and evaluated in the same manner as in Example 1. The results obtained are shown in Table 2 below.

Comparative Example 8

A magnetic tape was prepared in the same manner as in Example 5, except that the residual solvent contents of the surface layer and the back layer were adjusted to 1200 ppm and 900 ppm, respectively. A cassette for evaluation was prepared using the resulting magnetic tape in the same manner as in Example 1. The resulting magnetic tape and the cassette were tested and evaluated in the same manner as in Example 1. The results obtained are shown in Table 2 below.

TABLE 1

| | | | Examples | | | | | | | | |
|---|---|---|---|---|---|---|---|---|---|---|---|
| | | | 1 | 2 | 3 | 4 | 5 | 6 | 7 | 8 | 9 |
| Magnetic Layer: | Magnetic Coating Composition | | A | A | A | A | A | B | 13 | B | C |
| | Thickness (μm) | | 0.2 | 0.2 | 0.15 | 0.1 | 0.2 | 0.2 | 0.2 | 0.2 | 0.2 |
| Intermediate Layer: | Intermediate Coating Composition*1 | | (a) | (b) | (c) | (d) | (e) | (e) | (e) | (e) | (e) |
| | Thickness (μm) | | 1.3 | 1.3 | 1.35 | 1.4 | 1.3 | 1.3 | 1.3 | 1.3 | 1.3 |
| Ratio of Squareness of Magnetic Layer | | | 0.90 | 0.89 | 0.91 | 0.92 | 0.89 | 0.89 | 0.89 | 0.89 | 0.89 |
| ΔBs of Magnetic Layer (%) | | | 6.2 | 6.2 | 6.4 | 6.6 | 6.2 | 7.5 | 7.2 | 7.0 | 4.2 |
| Young's Modulus E (kN · mm²) | | | 10.9 | 10.6 | 11.0 | 11.4 | 11.2 | 11.3 | 11.7 | 12.0 | 11.4 |
| Bending Stiffness ($10^{-4}$ N · mm²) | | | 9.50 | 9.24 | 9.59 | 9.94 | 9.77 | 9.65 | 10.2 | 10.5 | 9.94 |
| Residual Solvent Content | Surface Layer (ppm) | | 400 | 200 | 500 | 700 | 180 | 350 | 120 | 30 | 20 |
| | Back Layer (ppm) | | 280 | 400 | 100 | 200 | 300 | 550 | 230 | 70 | 60 |
| Center-Line Surface Roughness Ra | Before Storage | Magnetic Layer (nm) | 3.6 | 3.5 | 3.4 | 3.3 | 3.8 | 3.1 | 3.1 | 3.1 | 4.1 |
| | | Backcoating Layer (nm) | 5.6 | 5.4 | 5.4 | 5.1 | 5.7 | 5.4 | 5.4 | 5.4 | 5.5 |
| | After Storage | Magnetic Layer (nm) | 3.9 | 3.7 | 3.8 | 3.5 | 4.0 | 3.6 | 3.4 | 3.3 | 1.3 |
| | | Backcoating Layer (nm) | 5.7 | 5.6 | 5.6 | 5.4 | 5.7 | 5.8 | 5.7 | 5.6 | 5.7 |
| C/N Characteristics*2 (dB) | Before Storage | | +0.5 | +0.5 | +0.6 | +0.8 | +0.4 | +0.7 | +0.7 | +0.7 | +0.2 |
| | After Storage | | −0.1 | −0.1 | +0.1 | +0.2 | −0.3 | 0.0 | +0.2 | +0.3 | +0.1 |
| Ratio of Change in Error Rate | | | 4.2 | 4.4 | 4.8 | 5.2 | 5.2 | 4.3 | 3.6 | 3.2 | 26 |

Note:
*1Compositions (a), (b) and (c) are magnetic intermediate coating compositions, and compositions (d) and (e) are nonmagnetic intermediate coating compositions.
*2Expressed relatively taking the before storage C/N of Comparative Example 1 as a standard (0 dB).
*3Ratio of change in error rate (error rate after storage)/(error rate before storage).

TABLE 2

| | | | Comparative Examples | | | | | | | |
|---|---|---|---|---|---|---|---|---|---|---|
| | | | 1 | 2 | 3 | 4 | 5 | 6 | 7 | 8 |
| Magnetic Layer: | Magnetic Coating Composition | | D | D | A | A | A | A | B | A |
| | Thickness (μm) | | 0.2 | 0.2 | 1.5 | 0.2 | 0.15 | 0.2 | 0.2 | 0.2 |
| Intermediate Layer: | Intermediate Coating Composition*1 | | (a) | (d) | — | (b) | (c) | (e) | (e) | (e) |
| | Thickness (μm) | | 1.3 | 1.3 | (*4) | 1.3 | 1.35 | 1.3 | 1.3 | 1.3 |
| Ratio of Squareness of Magnetic Layer | | | 0.91 | 0.91 | 0.85 | 0.90 | 0.91 | 0.89 | 0.89 | 0.89 |
| ΔBs of Magnetic Layer (%) | | | 12 | 12 | 6.0 | 6.2 | 6.4 | 6.2 | 7.5 | 6.2 |
| Young's Modulus E (kN · mm²) | | | 11.0 | 11.5 | 11.9 | 10.3 | 11.2 | 10.7 | 10.1 | 9.9 |
| Bending Stiffness ($10^{-4}$ N · mm²) | | | 9.59 | 10.0 | 10.4 | 8.98 | 9.77 | 9.33 | 8.81 | 8.63 |
| Residual Solvent Content | Surface Layer (ppm) | | 550 | 300 | 400 | 300 | 500 | 1200 | 350 | 1200 |
| | Back Layer (ppm) | | 300 | 300 | 250 | 450 | 90 | 500 | 900 | 900 |
| Center-Line Surface Roughness Ra | Before Storage | Magnetic Layer (nm) | 3.9 | 4.0 | 4.2 | 6.2 | 3.8 | 3.9 | 3.7 | 4.1 |
| | | Backcoating Layer (nm) | 5.4 | 5.3 | 5.5 | 5.7 | 10.2 | 5.5 | 5.4 | 5.2 |
| | After Storage | Magnetic Layer (nm) | 4.1 | 4.4 | 4.4 | 6.2 | 5.4 | 59 | (*5) | (*5) |
| | | Backcoating Layer (nm) | 5.8 | 5. | 5.6 | 5.9 | 10.1 | 5.7 | (*5) | (*5) |
| C/N Characteristics*2 (dB) | Before Storage | | 0 | +0.2 | −1.8 | −2.6 | +0.1 | −0.4 | −0.3 | −0.2 |
| | After Storage | | −1.3 | −1.2 | −2.2 | −2.4 | −2.6 | (*5) | (*5) | (*5) |
| Ratio of Change in Error Rate | | | 13 | 12 | 4.4 | 22 | 26 | (*5) | (*5) | (*5) |

Note:
*1Compositions (a), (b) and (c) are magnetic intermediate coating compositions, and compositions (d) and (e) are nonmagnetic intermediate coating compositions.
*2Expressed relatively taking the result (before storage) of Comparative Example 1 as a standard (0 dB).
*3Ratio of change in error rate (error rate af ter storage)/(error rate before storage).
(*4) Comparative Example 3 is a magnetic tape whose surface layer consists of only a magnetic layer formed by coating only the magnetic coating composition A.
(*5) Unmeasurable due to sticking of the tape.

As is apparent from the results shown in Tables 1 and 2, it is seen that the magnetic recording medium of the present invention exhibits excellent electromagnetic characteristics and does not exhibit a large deterioration in its electromagnetic characteristics during storage in any of the green state, the pancake state (after slitting), and in a cassette, owing to the specific residual solvent content in the surface layer, the specific ferromagnetic metal powder used in the magnetic layer, the specific thickness and center-line surface roughness of the magnetic layer, the specific residual solvent content in the back layer, and the specific center-line surface roughness of the backcoating layer.

This application is based on Japanese Patent Application Laid-Open 8-107909, filed on Apr. 26, 1995, which is incorporated herein by reference in its entirety.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A magnetic recording medium, having improved storage stability comprising a nonmagnetic substrate, a surface layer and a back layer, said surface layer having an intermediate layer provided on a surface side of said nonmagnetic substrate and a magnetic layer as a top layer, said back layer having a backcoating layer provided on a back side of said nonmagnetic substrate, and said magnetic layer containing a ferromagnetic metal powder and a binder, wherein said surface layer has a residual solvent content of 5 to 1000 ppm;

said ferromagnetic metal powder is a ferromagnetic metal powder mainly comprising iron and containing 0.8 to 20 parts by weight of at least one element selected from Group IIIa elements, inclusive of lanthanides, of the Periodic Table per 100 parts by weight of Fe atoms;

said magnetic layer has a thickness of 0.05 to 0.6 µm;

said magnetic layer has a center-line surface roughness, Ra, of 1 to 5 nm;

said back layer has a residual solvent content of 5 to 800 ppm; and said backcoating layer has a center-line surface roughness, Ra, of 2 to 8 nm.

2. The magnetic recording medium of claim 1, wherein said magnetic layer has a decay rate, ΔBs, of saturation flux density of not more than 10%, said decay rate, ΔBs, being defined by a rate of change in terms of percent ratio of a saturation flux density Bs' after standing at a temperature of 60° C. and 90% RH for 30 days to an initial saturation flux density Bs before the standing and is calculated with the formula ΔBs=(1-Bs'/Bs)×100.

3. The magnetic recording medium of claim 1, wherein said magnetic recording medium has a thickness of 3 to 10 µm and a bending stiffness of $7 \times 10^{-4}$ to $4.2 \times 10^{-3}$ N·mm².

4. The magnetic recording medium of claim 1, wherein said ferromagnetic metal powder has an acicular or spindle shape, a specific surface area of 38 to 80 m²/g, and a major axis length of 0.03 to 0.2 µm.

5. The magnetic recording medium of claim 1, wherein said ferromagnetic metal powder contains 0.5 to 66 parts by weight of Co atoms per 100 parts by weight of Fe atoms.

6. The magnetic recording medium of claim 1, wherein said magnetic recording medium has a Young's modulus, E, of 5 to 15 kN/mm².

7. The magnetic recording medium of claim 1, wherein said intermediate layer is formed from an intermediate coating composition comprising a solvent for an intermediate coating composition containing a high-boiling solvent having a boiling point of 130° to 180° C., and said magnetic layer is formed from a magnetic coating composition comprising a solvent for a magnetic coating composition containing said high-boiling solvent.

8. The magnetic recording medium of claim 1, wherein said intermediate layer is formed from an intermediate coating composition comprising a solvent for an intermediate coating composition containing a low-volatile solvent having a solvent evaporation rate index of 10 to 45, and said magnetic layer is formed from a magnetic coating composition comprising a solvent for a magnetic coating composition containing said low-volatile solvent.

9. The magnetic recording medium of claim 1, wherein said intermediate layer is formed from an intermediate coating composition which comprises, as a solvent for said intermediate coating composition, a mixed solvent containing a high-boiling solvent, a low-volatile solvent, and/or a high-boiling and low-volatile solvent, said high-boiling solvent having a boiling point of 130° to 180° C., said low-volatile solvent having a solvent evaporation rate index of 10 to 45, said high-boiling and low-volatile solvent having both a boiling point of 130° to 180° C. and a solvent evaporation rate index of 10 to 45, the proportion of said high boiling solvent, said low-volatile solvent, and/or said high-boiling and low-volatile solvent in said mixed solvent is 5 to 90% by weight, and said magnetic layer is formed from a magnetic coating composition comprising said mixed solvent as a solvent for said magnetic composition.

10. The magnetic recording medium of claim 1, wherein said intermediate layer has a thickness of 0.2 to 5 µm.

11. The magnetic recording medium of claim 1, wherein said magnetic layer has a coercive force of 1800 to 2400 Oe.

12. The magnetic recording medium of claim 1, wherein said ferromagnetic metal powder has a saturation magnetization of 100 to 180 emu/g.

13. The magnetic recording medium of claim 1, wherein said magnetic layer has a center-line surface roughness, Ra, of 1.5 to 4.5 nm.

14. The magnetic recording medium of claim 1, wherein said magnetic layer has a center-line surface roughness, Ra, of 2 to 4.2 nm.

15. The magnetic recording medium of claim 1, wherein said surface layer has a residual solvent content of 5 to 900 ppm.

16. The magnetic recording medium of claim 1, wherein said surface layer has a residual solvent content of 5 to 800 ppm.

17. The magnetic recording medium of claim 1, wherein said back layer has a residual solvent content of 5 to 700 ppm.

18. The magnetic recording medium of claim 1, wherein said back layer has a residual solvent content of 5 to 600 ppm.

19. The magnetic recording medium of claim 1, wherein said backcoating layer has a center-line surface roughness, Ra, of 2 to 7 nm.

20. The magnetic recording medium of claim 1, wherein said backcoating layer has a center-line surface roughness, Ra, of 2.5 to 6 nm.

21. A magnetic recording medium having improved storage stability, comprising a nonmagnetic substrate, a surface layer and a back layer, said surface layer having an intermediate layer provided on a surface side of said nonmagnetic substrate and a magnetic layer as a top layer, said back layer having a back-coating layer provided on a back side of said nonmagnetic substrate, and said magnetic layer containing a ferromagnetic metal powder and a binder, wherein said surface layer has a residual solvent content of 5 to 1000 ppm;

said ferromagnetic metal powder is a ferromagnetic metal powder mainly comprising iron and containing 0.8 to 20 parts by weight of at least one element selected from Group IIIa elements, inclusive of lanthanides, of the Periodic Table per 100 parts by weight of Fe atoms;

said magnetic layer has a thickness of 0.05 to 0.6 µm;

said magnetic layer has a center-line surface roughness, Ra, of 1 to 5 nm;

said intermediate layer has a thickness of 0.2 to 5 µm;

said back layer has a residual solvent content of 5 to 800 ppm; and said back-coating layer has a center-line surface roughness, Ra, of 2 to 8 nm.

* * * * *